(12) United States Patent
Taguchi

(10) Patent No.: US 8,243,288 B2
(45) Date of Patent: Aug. 14, 2012

(54) OBJECT DETECTION SYSTEM AND OBJECT DETECTION METHOD

(75) Inventor: Ayumu Taguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 12/838,521

(22) Filed: Jul. 19, 2010

(65) Prior Publication Data

US 2011/0019203 A1    Jan. 27, 2011

(30) Foreign Application Priority Data

Jul. 27, 2009    (JP) ................. 2009-174328

(51) Int. Cl.
 *G01B 11/14*    (2006.01)
 *G01B 11/26*    (2006.01)
(52) U.S. Cl. .............. 356/614; 356/612; 356/141.1
(58) Field of Classification Search .......... 356/602–614, 356/3.01, 3.03, 3.1, 3.15, 4.1, 141.1; 382/154
See application file for complete search history.

(56) References Cited

U.S. PATENT DOCUMENTS

| | | | | |
|---|---|---|---|---|
| 4,108,539 A | * | 8/1978 | Gort et al. | 359/731 |
| 4,820,041 A | * | 4/1989 | Davidson et al. | 356/3.12 |
| 6,317,202 B1 | * | 11/2001 | Hosokawa et al. | 356/141.1 |
| 6,545,286 B1 | * | 4/2003 | Ross et al. | 250/577 |
| 6,859,269 B2 | * | 2/2005 | Ohtomo et al. | 356/141.1 |
| 7,136,753 B2 | * | 11/2006 | Samukawa et al. | 701/301 |
| 7,688,348 B2 | * | 3/2010 | Lubard et al. | 348/144 |
| 7,933,001 B2 | * | 4/2011 | Otani et al. | 356/3.14 |
| 2008/0285010 A1 | * | 11/2008 | Shoji et al. | 356/5.01 |
| 2010/0149518 A1 | * | 6/2010 | Nordenfelt et al. | 356/4.01 |

FOREIGN PATENT DOCUMENTS

JP    2000-270203    9/2000

* cited by examiner

*Primary Examiner* — Sang Nguyen
(74) *Attorney, Agent, or Firm* — SNR Denton US LLP

(57) ABSTRACT

Disclosed herein is an object detection system including, a light radiation section, a light sweeping block, a light reflection body, a reflected-light detection section, and a reflected-light analysis section.

6 Claims, 12 Drawing Sheets

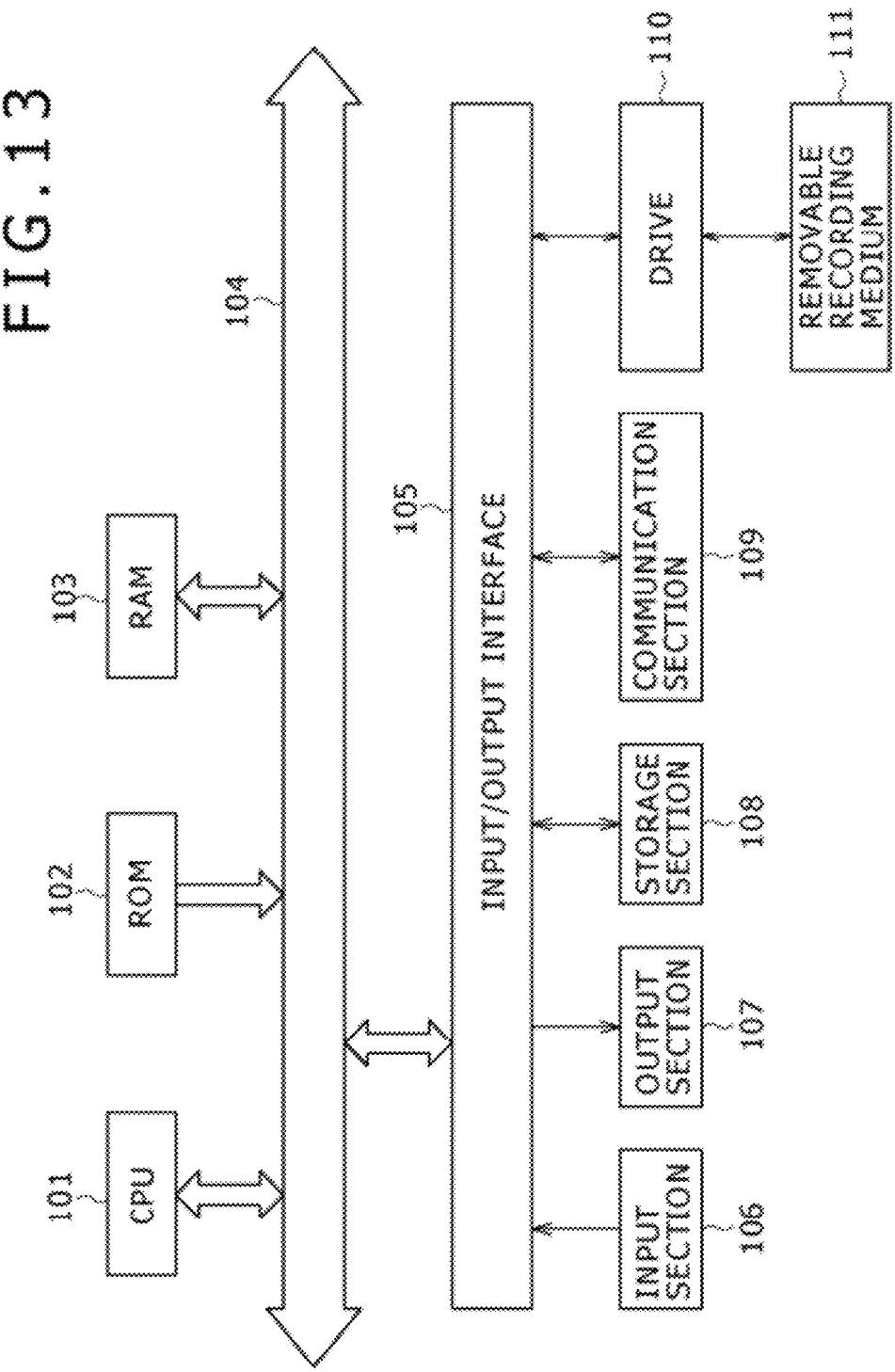

OBJECT DETECTION SYSTEM AND OBJECT DETECTION METHOD

BACKGROUND OF THE INVENTION

1. Field of the Invention

In general, the present invention relates to an object detection system and an object detection method adopted by the object detection system. More particularly, the present invention relates to an object detection system capable of detecting the movement of an object more simply and more precisely than the known object detection system and relates to an object detection method adopted in the object detection system.

2. Description of the Related Art

In fields such as a field of creating a CG (Computer Graphic) image for example, in order to express natural movements of a human being, images of actual movements of a human being are taken by a camera in a photographing operation and, then, movements of a human-body member such as an arthrosis of the human being are obtained as data from images obtained as a result of the photographing operation.

In order to detect movements of a human-body member such as an arthrosis of the human being in an object detection operation, there is adopted a method by which a probe is attached to the member serving as a target of the object detection operation and a scanning operation using light is carried out on the target in order to acquire an optical signal received by the probe. In addition, another method for determining and detecting the position of a human-body member such as an arthrosis with a chromakey technique is disclosed in Japanese Patent Laid-open No. 2000-270203. For example, a person wearing a black cloth to serve as the subject of a measurement operation applies a marker having an orange color to a human-body member such as an arthrosis of the person which is a target of the measurements carried out in an object detection operation. Then, the person moves the arthrosis with the marker having an orange color in front of a black background. Two cameras serving as a stereo camera are used to take images of the person subject to an object detection operation and movements of the marker are detected.

SUMMARY OF THE INVENTION

In a method using a probe, however, it is necessary to transmit an optical signal received by the probe by wire or radio communication. Thus, the object detection system adopting the method becomes elaborate so that the system cannot be made at a low cost. In addition, in the method based on the chromakey technique, the background and the person subject to a measurement operation are required to have a uniform color which is black in the example described above. Thus, there are large constraints imposed on the implementation environment.

There is provided a method by which, in an ordinary environment with no black cloth on, an image of a movement of a person subject to a measurement operation is taken by a stereo camera and, with a mouse, a specific person member such as an arthrosis is specified as an area serving as an object of a measurement carried out in an object detection operation performed for detecting a movement of the specified area. In a process of detecting a movement of an area specified on an image taken by carrying out a photographing operation in such an ordinary environment to serve as an object of a measurement carried out in an object detection operation, however, it is difficult to keep track of the object of a measurement with a high degree of stability.

In addition, there is also a method for acquiring the entire shape of a three-dimensional object. By adoption of the method for acquiring the entire shape of a three-dimensional object, however, it is difficult to extract information on the position of an arthrosis or the like with a high degree of precision and a high degree of stability. Typical examples of the method for acquiring the entire shape of a three-dimensional object are the so-called round-trip propagation time method and the so-called encoding light projection method.

Addressing the problems described above, inventors of the present invention have innovated an object detection system capable of detecting the movement of an object more simply and more precisely than the known object detection system and innovated an object detection method to be adopted in the object detection system.

An object detection system (such as an object detection system 1 shown in a diagram of FIG. 1 and a block diagram of FIG. 4) according to an embodiment of the present invention employs:

a light radiation section (such as a light-pattern projection section 11) configured to radiate light of a two-dimensional pattern to an object;

a light sweeping block (such as a light sweeping block 23) configured to carry out a sweeping operation by continuously changing the radiation direction of the radiated light of a two-dimensional pattern within a space (such as a radiation range 4) determined in advance;

a light reflection body (such as a light reflection body 3) attached to a predetermined location (or a predetermined member) on the object to serve as a detection subject and used for reflecting the light of a two-dimensional pattern in a direction opposite to the radiation direction of the light of a two-dimensional pattern;

a reflected-light detection section (such as the reflected-light detection section 12) configured to detect the light reflected by the light reflection body to appear as light arriving at the reflected-light detection section; and a reflected-light analysis section (such as the reflected-light analysis section 13) configured to compute vertical-direction and horizontal-direction angles, which are each formed by a line connecting the light radiation section to the light reflection body and a reference line in a vertical and horizontal direction respectively, on the basis of a signal representing the reflected light detected by the reflected-light detection section.

An object detection method (such as a method represented by a flowchart shown in FIG. 10) according to another embodiment of the present invention includes the steps of:

radiating light of a two-dimensional pattern to an object (typically at a step S1 of the flowchart);

carrying out a sweeping operation by continuously changing the radiation direction of the light of a two-dimensional pattern within a space determined in advance;

letting a detection subject attached to a predetermined location (or a predetermined member) on the object reflect the light of a two-dimensional pattern in a direction opposite to the radiation direction of the light of a two-dimensional pattern;

detecting the reflected light arriving from the detection subject (typically at a step S2 of the flowchart); and computing vertical-direction and horizontal-direction angles, which are each formed by a line connecting a light radiation section configured to radiate the light of a two-dimensional pattern to the detection subject and a reference line in a vertical or horizontal direction respectively, on the basis of a signal representing the detected reflected light (typically at a step S3 of the flowchart).

According to the embodiments of the present invention, the following processing is carried out as processes of:

radiating light of a two-dimensional pattern to an object;

carrying out a sweeping operation by continuously changing the radiation direction of the light of a two-dimensional pattern within a space determined in advance;

letting a detection subject attached to a predetermined location (or a predetermined member) on the object reflect the light of a two-dimensional pattern in a direction opposite to the radiation direction of the light of a two-dimensional pattern;

detecting the reflected light arriving from the detection subject; and computing angles, which are each formed by a line connecting a light radiation section configured to radiate the light of a two-dimensional pattern to the detection subject and a reference line in vertical and horizontal directions, on the basis of a signal representing the detected reflected light.

In accordance with the embodiments of the present invention, it is possible to provide an object detection system capable of detecting the movement of an object more simply and more precisely than the known object detection system and provide an object detection method to be adopted in the object detection system.

BRIEF DESCRIPTION OF THE DRAWINGS

These and other innovations as well as features of the present invention will become clear from the following description of preferred embodiments given with reference to accompanying diagrams, in which:

FIG. 2A is a diagram showing an angle θ formed on a plane oriented in the horizontal direction to serve as an angle at which a light reflection body is located;

FIG. 2B is a diagram showing an angle δ formed on a plane oriented in the vertical direction to serve as an angle at which the light reflection body is located;

FIG. 3A is a diagram showing a two-dimensional pattern of light radiated by an azimuth detector;

FIG. 3B is a diagram showing a pattern which is obtained by enlarging the two-dimensional pattern shown in the diagram of FIG. 3A;

FIG. 7A is a diagram showing a configuration in which the reflected-light detection section directly receives light reflected by the light reflection body 3;

FIG. 7B is a diagram showing a configuration in which the reflected-light detection section receives light reflected by the light reflection body 3 after the light passes through a polarized-light beam splitter and a ¼ wavelength plate.

FIG. 12A is a diagram showing a typical configuration in which a circular hologram sheet is used as the radiation-pattern generation block whereas a motor not shown in the diagram is used as the light sweeping block;

FIG. 12B is a diagram showing a typical configuration in which a cylinder is used as the radiation-pattern generation block whereas a motor not shown in the diagram is used as the light sweeping block; and FIG. 13 is a block diagram showing a typical configuration of a computer for carrying out processing to compute the azimuth and position of a light reflection body.

DETAILED DESCRIPTION OF THE PREFERRED EMBODIMENTS

[Outline of an Object Detection System 1]

An outline of an object detection system 1 according to an embodiment is explained by referring to diagrams of FIGS. 1 to 3 as follows.

Figure 1:
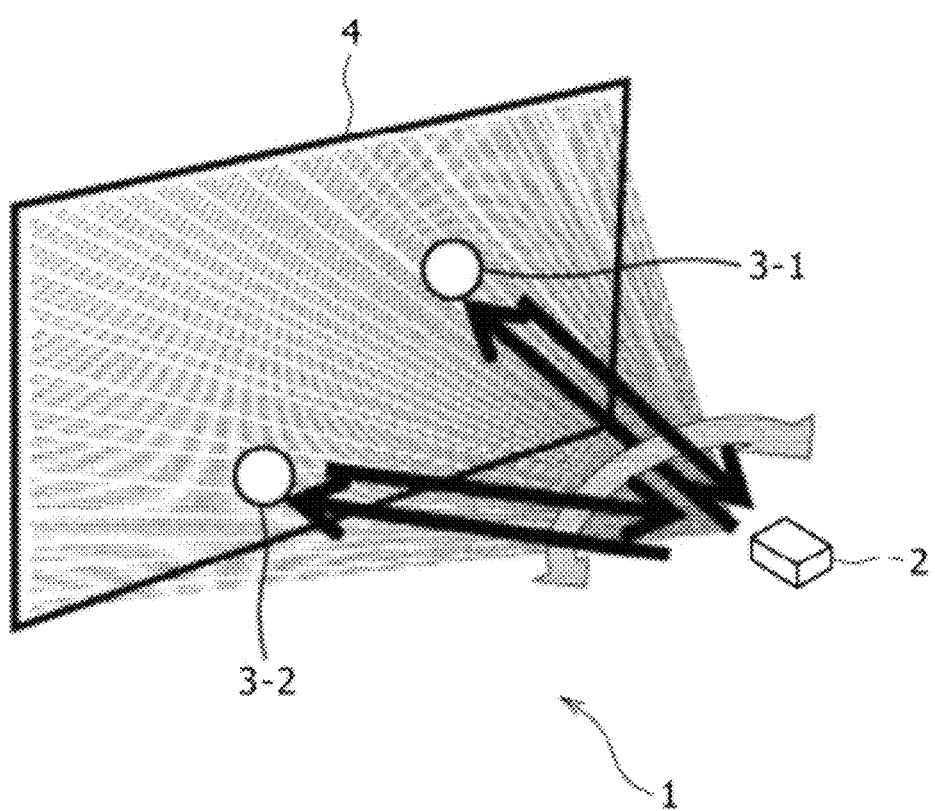
FIG. 1 is an explanatory diagram of an outline of an object detection system according to an embodiment of the present invention.

FIG. 1 is an explanatory diagram of an outline of the object detection system 1 according to an embodiment of the present invention. The object detection system 1 shown in the diagram of FIG. 1 to serve as a system for detecting an object employs an azimuth detector 2 and a light reflection body 3. The light reflection body 3 is placed at a location on the object or at a member of the object. The location or the member is determined in advance. In the case of the object detection system 1 shown in the diagram of FIG. 1 as a typical example, the light reflection body 3 consists of two light reflection bodies 3-1 and 3-2 which are placed at two different locations as detection subjects respectively.

The azimuth detector 2 carries out a sweeping operation by continuously changing the radiation direction of light of a known two-dimensional pattern in each of the horizontal and vertical directions over a range within an angle determined in advance. The light sweeping operation is thus an operation to move light of a two-dimensional pattern like one shown in a diagram of FIG. 3A to be described later in a direction determined in advance. It is to be noted that, in this embodiment, the horizontal direction is any direction parallel to the surface of the earth whereas the vertical direction is the direction perpendicular to the surface of the earth. The azimuth detector 2 carries out the sweeping operation by continuously changing the radiation direction of the light of a two-dimensional pattern over a range 4 within an angle determined in advance in each of the horizontal and vertical directions in order to radiate the light within the range 4. In the following description, the range 4 in which the azimuth detector 2 radiates the light of a two-dimensional pattern is referred to as a radiation range 4.

Since the radiation direction of the light of a two-dimensional pattern is continuously changed in the sweeping operation in the horizontal direction, the light reflection body 3-1 serving as a detection subject existing in the radiation range 4 experiences radiation of light having a pattern array lining up in the horizontal direction of the two-dimensional pattern of the radiated light. As shown in the diagram of FIG. 1, the light reflection body 3-1 reflects the light radiated to the light reflection body 3-1 in a direction opposite to the direction in which the light has been radiated to the light reflection body 3-1. As a result, the azimuth detector 2 receives only a light portion which is reflected by the light reflection body 3-1 as a portion of the radiated light of a two-dimensional pattern. The azimuth detector 2 then detects the movement of the light reflection body 3-1 from the received light portion.

The above description of the light radiated by the azimuth detector 2 to the light reflection body 3-1 and the light portion reflected by the light reflection body 3-1 to the azimuth detector 2 also holds true for the light reflection body 3-2 as well. In the following description, the light radiation bodies 3-1 and 3-2 are referred to simply as a light reflection body 3, which is a generic name for the light radiation bodies 3-1 and 3-2, in case it is not necessary to distinguish the light radiation bodies 3-1 and 3-2 from each other.

Figure 2A:
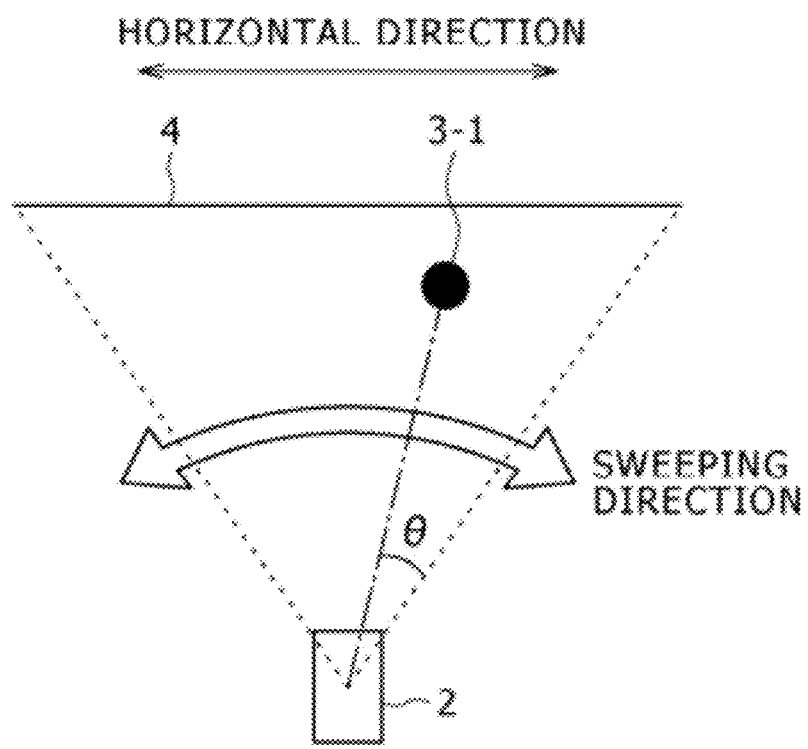
FIGS. 2A and 2B are explanatory diagrams of the outline of the object detection system according to the embodiment of the present invention.
Figure 2B:
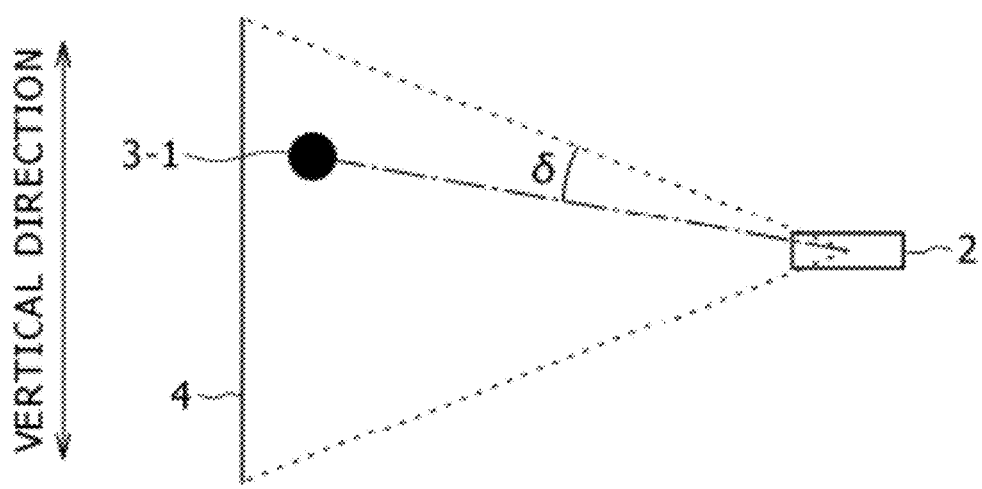

Referring to FIGS. 2A and 2B, the following description explains values each obtained as a detection result produced by the azimuth detector 2.

As a detection result, the azimuth detector 2 outputs the magnitude of an angle θ formed on a plane oriented in the horizontal direction as described below to serve as an angle at which a light reflection body 3 is located. As another detection result, the azimuth detector 2 outputs the magnitude of an angle δ formed on a plane oriented in the vertical direction as described below to serve as an angle at which a light reflection body 3 is located. That is to say, the azimuth detector 2 detects an azimuth at which the light reflection body 3 exists in the radiation range 4. In addition, by receiving light reflected from the light reflection body 3 continuously for a time period determined in advance, the azimuth detector 2 is also capable of detecting the movement (or the change) of the azimuth at which the light reflection body 3 exists.

As shown in the diagram of FIG. 2A, the angle θ is an angle between a line drawn in the optical-axis direction to serve as a reference line determined in advance and a line which connects the azimuth detector 2 to the light reflection body 3. In the case of the light sweeping operation carried out in the horizontal direction as shown in the diagram of FIG. 2A, the reference line is a line which connects the azimuth detector 2 to the right end of the radiation range 4. As shown in the diagram of FIG. 2B, on the other hand, the angle δ is an angle between a line drawn in the optical-axis direction to serve as a reference line determined in advance and a line which connects the azimuth detector 2 to the light reflection body 3. In the case of the light sweeping operation carried out in the vertical direction as shown in the diagram of FIG. 2B, the reference line is a line which connects the azimuth detector 2 to the upper end of the radiation range 4.

As described above, the azimuth detector 2 detects the position of the light reflection body 3 as angles which are each formed by taking a line drawn in the optical-axis direction to serve as a reference line determined in advance. It is to be noted that a method for detecting the position of the light reflection body 3 as a position in a three-dimensional coordinate system will be described later by referring to an explanatory diagram of FIG. 11.

Figure 3A:
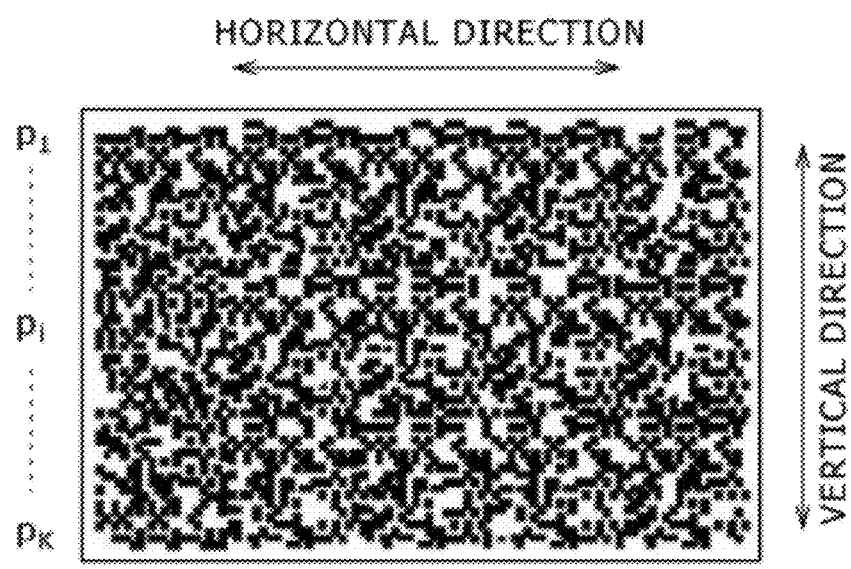
FIGS. 3A and 3B are explanatory diagrams of the outline of the object detection system according to the embodiment of the present invention.
Figure 3B:

FIG. 3A is a diagram showing a two-dimensional pattern of light radiated by the azimuth detector 2 whereas FIG. 3B is a diagram showing a pattern which is obtained by enlarging the two-dimensional pattern shown in the diagram of FIG. 3A.

The two-dimensional pattern shown in the explanatory diagram of FIG. 3A is configured to include code series generated by making use of two-dimensional M-sequence random numbers indicating the nonexistence and existence of a square pattern.

The two-dimensional pattern shown in the explanatory diagram of FIG. 3A has K code series $p_1$ to $p_c$ which are arranged in the vertical direction. Notation p denotes a pattern. Each of the code series $p_1$ to $p_k$ is a pattern row oriented in the horizontal direction. That is to say, a pattern row oriented in the horizontal direction is a unit of the code series $p_1$ to $p_k$ which compose the two-dimensional pattern.

As described above, FIG. 3B shows a pattern which is obtained by enlarging the two-dimensional pattern shown in the diagram of FIG. 3A.

As shown in the explanatory diagram of FIG. 3B, each of the K code series $p_i$ each oriented in the horizontal direction where i=1, 2 . . . to K is independent of any other code series $p_j$ which is stretched along a row different from the row allocated to the code series $p_i$ where j≠i. In addition, each of the K code series $p_i$ exhibits a characteristic of being orthogonal to any other code series $p_j$. Thus, the azimuth detector 2 is capable of detecting the azimuth (that is, the angle δ) by identifying a code series $p_i$ which exists among the detected K code series $p_1$ to $p_k$.

It is to be noted that, as described above, the two-dimensional pattern shown in the explanatory diagram of FIG. 3A is generated by making use of two-dimensional M-sequence random numbers. Thus, if the two-dimensional pattern is seen as K code series $p_1$ to $p_k$ arranged in the vertical direction, the two-dimensional pattern appears as a pattern in which each of the K code series $p_i$ each oriented in the horizontal direction is orthogonal to any other code series $p_j$ which is stretched along a row different from the row allocated to the code series $p_i$. In the case of a configuration in which the light sweeping operation is carried out in the vertical direction, however, each of the K code series $p_i$ each oriented in the horizontal direction is not required to exhibit a characteristic of being orthogonal to any other code series $p_j$ which is stretched along a row different from the row allocated to the code series $p_i$.

As for the horizontal direction, on the other hand, the azimuth detector 2 radiates light of a two-dimensional pattern to an object while carrying out a light sweeping operation in the horizontal direction so that the light of a code series $p_j$ where j=1, 2, . . . or K is sequentially radiated to positions (that is, azimuths) arranged in the horizontal direction within the radiation range 4. If the light reflection body 3 exists at an azimuth corresponding to an early start time of the radiation of light of the code series $p_j$, the light of the code series $p_j$ is reflected by the light reflection body 3 to arrive at the azimuth detector 2 at an early time as well. If the light reflection body 3 exists at an azimuth corresponding to a late start time of the radiation of light of the code series $p_j$, on the other hand, the light of the code series $p_j$ is reflected by the light reflection body 3 to arrive at the azimuth detector 2 at a late time as well. That is to say, the horizontal-direction angle θ of the light reflection body 3 can be detected as a phase shift of the light of the code series $p_j$. Thus, the azimuth detector 2 is capable of detecting the horizontal-direction angle θ of the light reflection body 3 as the horizontal-direction position of the light reflection body 3 by computing the delay time. The delay time is a time period from the radiation start time to a time at which the light of the code series $p_j$ is detected.

[Typical Configuration of the Object Detection System 1]

Figure 4:
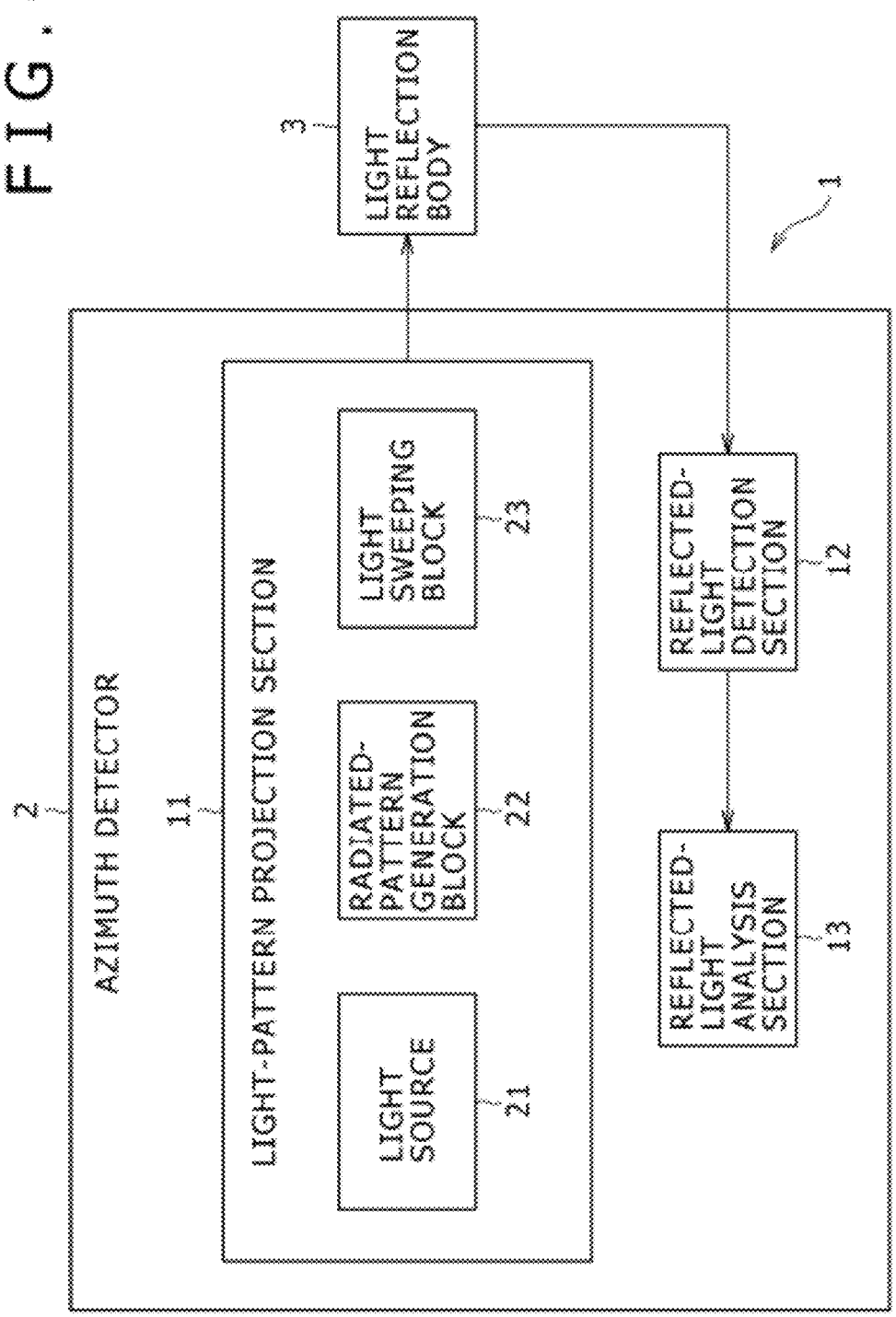
FIG. 4 is a functional block diagram showing functional blocks composing the object detection system according to the embodiment of the present invention.

FIG. 4 is a functional block diagram showing functional blocks composing an object detection system of FIG. 1 as the object detection system 1 according to the embodiment of the present invention.

As shown in the figure, the azimuth detector 2 employed in the object detection system 1 has a light-pattern projection section 11, a reflected-light detection section 12 and a reflected-light analysis section 13 whereas the light-pattern projection section 11 includes a light source 21, a radiation-pattern generation block 22 and a light sweeping block 23.

The light source 21 is a source for emitting laser light (that is, helium neon laser light) which has a wavelength of 633 nm. It is to be noted, however, that the wavelength of the laser light does not have to be 633 nm. That is to say, the light source 21 may emit laser light which has a wavelength other than 633 nm. In addition, in place of the light source 21, the light-pattern projection section 11 may employ another light source such as a xenon lamp, a halogen lamp or an LED.

The radiation-pattern generation block 22 is a block for generating light of a two-dimensional pattern shown in the diagram of FIG. 3A by making use the laser light which is generated by the light source 21 as parallel laser light rays and for supplying the generated light to the light sweeping block 23. The light sweeping block 23 is a block for carrying out a light sweeping operation in horizontal and vertical directions within a predetermined range of angles by continuously changing the direction of radiation of light which is received from the radiation-pattern generation block 22 as the light of a two-dimensional pattern.

The reflected-light detection section 12 is typically a photodiode. The reflected-light detection section 12 is a section configured to detect light reflected by the light reflection body 3 and received by the reflected-light detection section 12 as a portion of light radiated by the light-pattern projection section 11 to the light reflection body 3. The reflected-light detection section 12 outputs a detection signal to the reflected-light analysis section 13. The detection signal output by the reflected-light detection section 12 to the reflected-light analysis section 13 is an electrical signal which indicates whether or not the light portion reflected by the light reflection body 3 has been detected.

The reflected-light analysis section 13 is a section configured to compute a horizontal-direction angle θ and a vertical-direction angle δ, which indicate the position of the light reflection body 3, on the basis of the detection signal received from the reflected-light detection section 12.

Next, the configurations of the sections composing the azimuth detector 2 are explained by referring to diagrams as follows.

[Typical Configuration of the Radiated-Pattern Generation Section 22 and the Light Sweeping Block 23]

Figure 5:
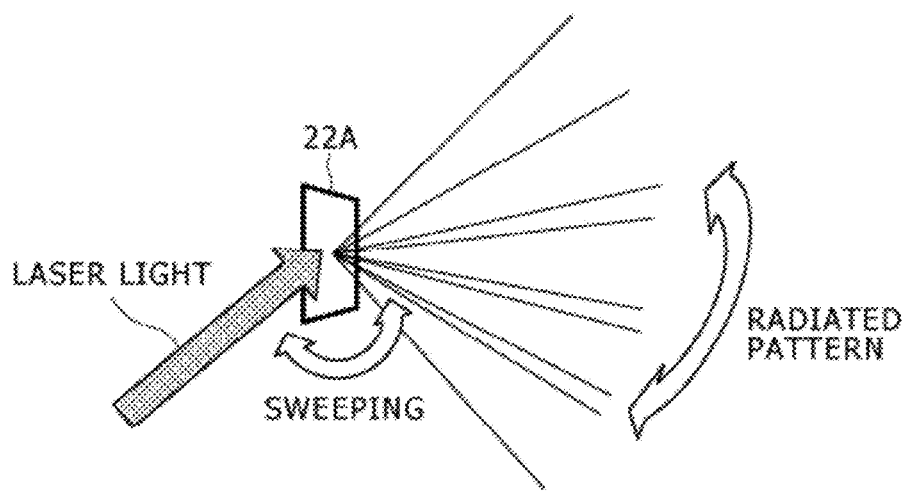
FIG. 5 is a diagram showing a typical configuration of a radiation-pattern generation block and a light sweeping block which are employed in the object detection system according to the embodiment of the present invention.

FIG. 5 is a diagram showing a typical configuration of the radiation-pattern generation block 22 and the light sweeping block 23 which are employed in the azimuth detector 2 of the object detection system 1 according to the embodiment of the present invention.

In the configuration shown in the diagram of FIG. 5, a hologram sheet 22A serves as the radiation-pattern generation block 22. The hologram sheet 22A has a planar shape of a plane on which the two-dimensional pattern shown in the diagram of FIG. 3A is created. A galvano mirror not shown in the diagram of FIG. 5 is used as the light sweeping block 23. By using the light sweeping block 23, the hologram sheet 22A carries out a light sweeping operation by changing the direction of the radiation of light of the two-dimensional pattern in a back-and-forth movement within an angle range determined at a frequency of about 100 Hz. As a result, the light of the two-dimensional pattern is radiated.

[Typical Configuration of the Light Reflection Body 3]

Figure 6:
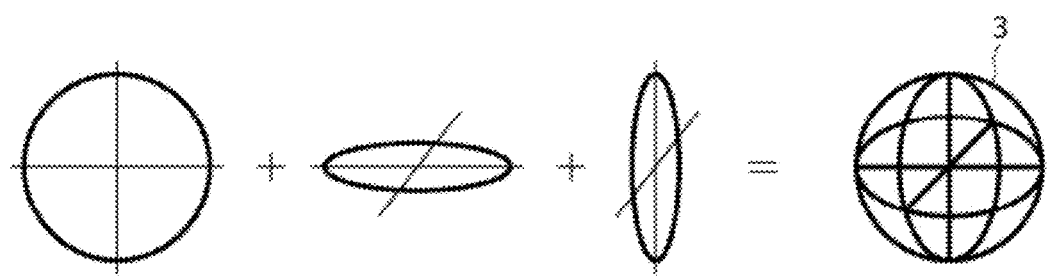
FIG. 6 is a diagram showing a typical configuration of a light reflection body employed in the object detection system according to the embodiment of the present invention.

FIG. 6 is a diagram showing a typical configuration of a light reflection body 3 employed in the object detection system 1 according to the embodiment of the present invention.

As shown in the diagram of FIG. 6, the light reflection body 3 is composed of 3 circular light radiation plates which each have a circular shape and share a center common to the three circular light radiation plates. Each of the three circular light radiation plates has mirror front and rear surfaces. The three circular light radiation plates are so assembled that the plates are perpendicular to each other. Thus, the light reflection body 3 functions as a corner cube for all azimuths. The light reflection body 3 reflects arriving light in a direction opposite to the direction of the arriving light.

It is to be noted that, the longer the distance along which light radiated from the light-pattern projection section 11 as light of the two-dimensional pattern propagates, the larger the size of the two-dimensional pattern. The size of the two-dimensional pattern is determined by the size of each square pattern which corresponds to the value 0 or 1 in the code series. That is to say, the size of the two-dimensional pattern is determined by the unit code width. An ideal size of the light reflection body 3 is such a size of the light reflection body 3 that, when light is radiated to the light reflection body 3, the size of the light reflection body 3 just accommodates a square pattern which corresponds to the value 0 or 1 in the code series.

[Position of the Reflected-Light Detection Section 12]

Figure 7:
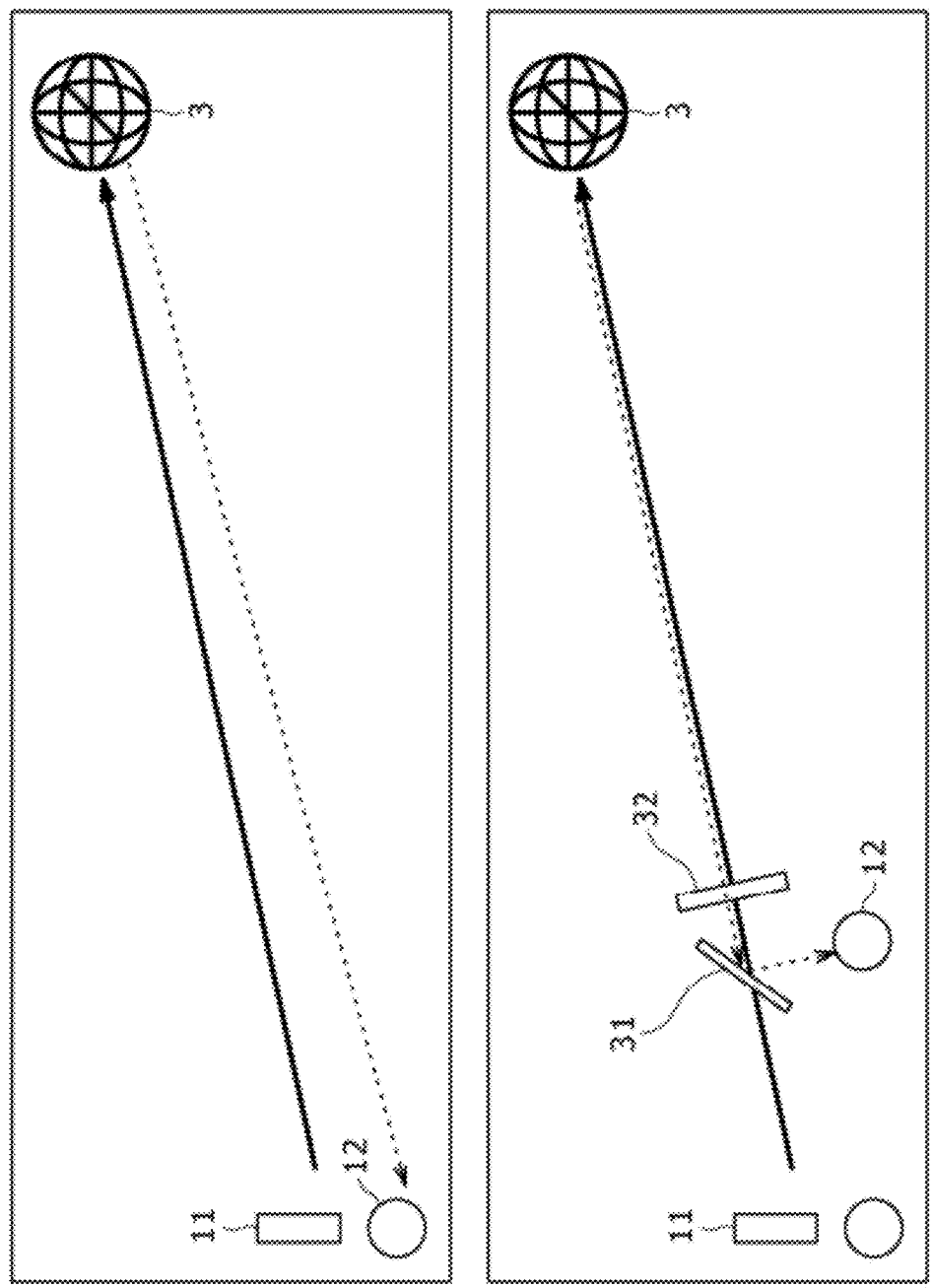
FIGS. 7A and 7B are diagrams each showing the positions of a reflected-light detection section and the light reflection body which are employed in the object detection system according to the embodiment of the present invention.

FIGS. 7A and 7B are diagrams each showing the position of the reflected-light detection section 12 and the position of the light reflection body 3.

As shown in the diagram of FIG. 7A, the reflected-light detection section 12 is placed at a position in close proximity to the light-pattern projection section 11 and within the range of a light spread between a light beam radiated by the light-pattern projection section 11 and a light beam reflected by the light reflection body 3. At such a position, the reflected-light detection section 12 is capable of receiving light reflected by the light reflection body 3.

As shown in the diagram of FIG. 7B, on the other hand, the polarized-light beam splitter 31 and the ¼ wavelength plate 32 are provided in front of the front surface of the light-pattern projection section 11. In this configuration, the reflected-light detection section 12 is placed at a position separated away from the light-pattern projection section 11 in a direction perpendicular to an optical axis which connects the light-pattern projection section 11 to the light reflection body 3. At such a position, the reflected-light detection section 12 is capable of receiving light reflected by the light reflection body 3. It is to be noted that, in place of the polarized-light beam splitter 31 and the ¼ wavelength plate 32, a half mirror can be employed in the object detection system 1.

[Processing Carried Out by the Reflected-Light Detection Section 12]

Next, a signal detected by the reflected-light detection section 12 is explained below by referring to an explanatory diagram of FIG. 8.

Figure 8:
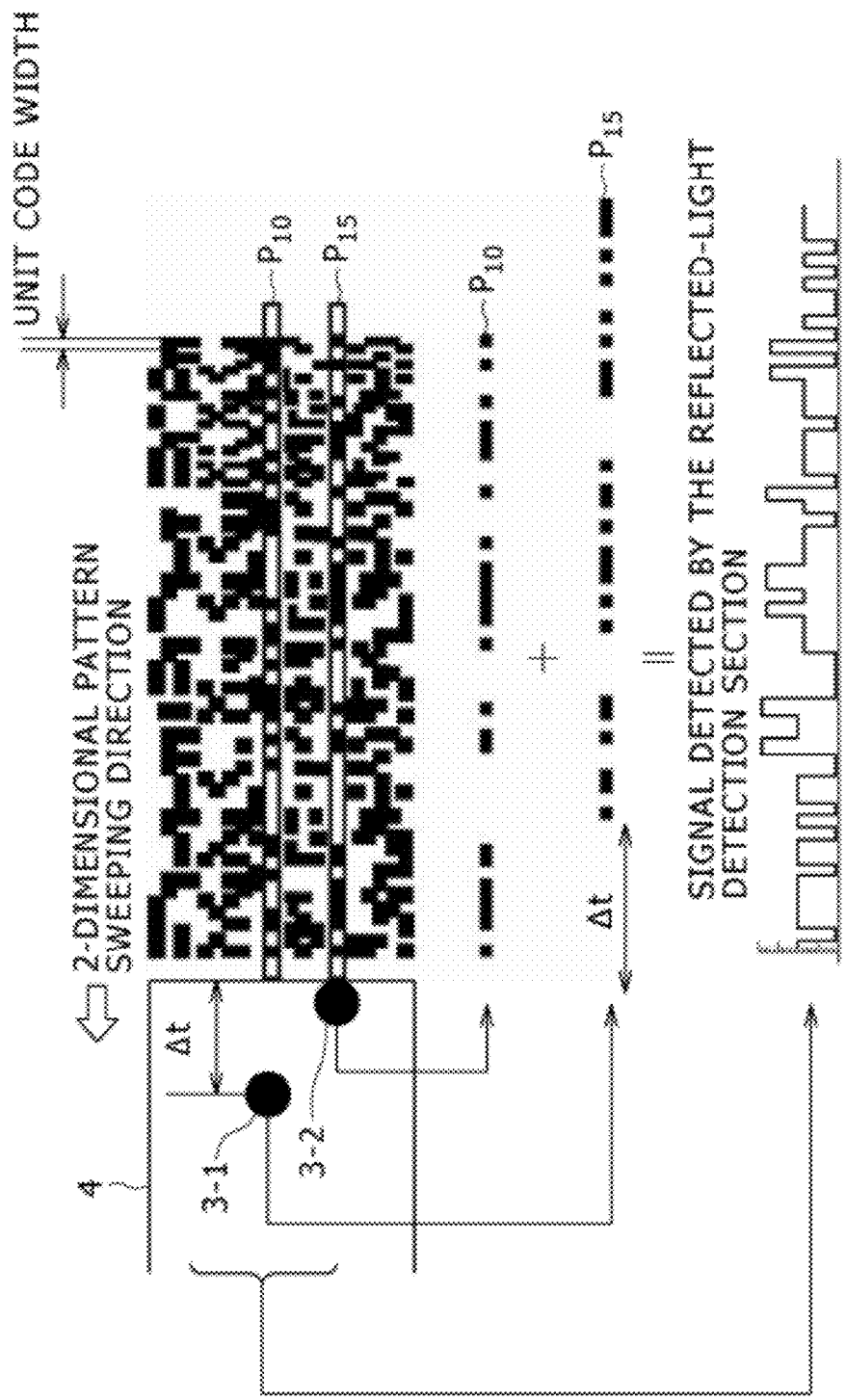
FIG. 8 is an explanatory diagram of processing carried out by the reflected-light detection section.

FIG. 8 shows a typical case in which, in the vertical direction, the light reflection body 3-1 is positioned at an azimuth to which light of a code series $p_{10}$ is radiated whereas the light reflection body 3-2 is positioned at an azimuth to which light of a code series $p_{15}$ is radiated.

In the horizontal direction, on the other hand, the light reflection body 3-2 is positioned at an azimuth corresponding to the right end of the radiation range 4 whereas the light reflection body 3-1 is positioned at an azimuth representing a location which is reached within a time period of Δt the sweeping velocity of the two-dimensional pattern if the light sweeping operation carried out by continuously changing the radiation direction of light of the two-dimensional pattern is started from the right end of the radiation range 4.

It is to be noted that the round-trip propagation time is assumed to be a time period that can be ignored.

In the vertical direction, when the light-pattern projection section 11 radiates light of the two-dimensional pattern, a light portion of a code series of the two-dimensional pattern is reflected by the light reflection body 3 to the reflected-light detection section 12 and, from the position of the light reflection body 3, it is possible to determine which code series has radiated the light portion reflected by the light reflection body 3 to the reflected-light detection section 12. That is to say, the reflected-light detection section 12 receives a light portion reflected by the light reflection body 3-1 as a light portion of the code series $p_{10}$. On the other hand, the reflected-light detection section 12 receives a light portion reflected by the light reflection body 3-2 as a light portion of the code series $p_{15}$.

As for the horizontal direction, when the light sweeping operation carried out by continuously changing the radiation direction of light of the two-dimensional pattern is started from the right end of the radiation range 4, a light portion radiated by the code series $p_{15}$ is immediately radiated to the light reflection body 3-2. Thus, the reflected-light detection section 12 immediately detects a light portion reflected by the light reflection body 3-2 as the light portion of the code series $p_{15}$. On the other hand, a light portion of the code series $p_{10}$ is radiated to the light reflection body 3-1 at a point of time which lags behind the start of the light sweeping operation of the two-dimensional pattern by the delay time Δt cited earlier. Thus, the reflected-light detection section 12 detects a light portion reflected by the light reflection body 3-1 as the light portion of the code series $p_{10}$ at the point of time which lags behind the start of the light sweeping operation carried out by continuously changing the radiation direction of light of the two-dimensional pattern by the delay time Δt.

As a result, until the delay time Δt lapses, the reflected-light detection section 12 detects only the light portion of the code series $p_{15}$. After the lapse of the delay time Δt, however, the reflected-light detection section 12 detects light which is a synthesis of the light portion of the code series $p_{15}$ and the light portion of the code series $p_{10}$. With a timing to receive both the light portion of the code series $p_{15}$ and the light portion of the code series $p_{10}$, the level of a signal representing the light detected by the reflected-light detection section 12 is doubled. Thus, prior to a process carried out by the reflected-light analysis section 13 provided at a stage following the reflected-light detection section 12 to analyze a synthesis signal received from the reflected-light detection section 12, the reflected-light analysis section 13 needs to separate a signal representing the light portion of the code series $p_{15}$ and a signal representing the light portion of the code series $p_{10}$ from the synthesis signal which is received from the reflected-light detection section 12 as a signal representing the synthesis light detected by the reflected-light detection section 12.

[Processing of the Reflected-Light Analysis Section 13]

Figure 9:
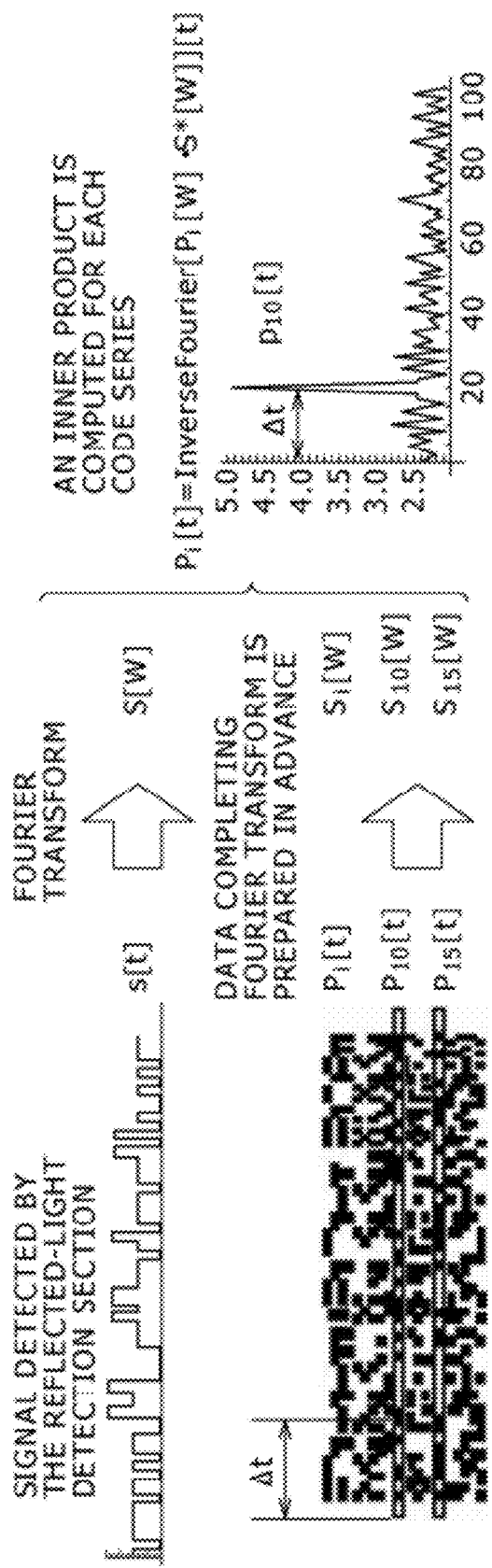
FIG. 9 is an explanatory diagram of processing carried out by a reflected-light analysis section.

FIG. 9 is an explanatory diagram of processing carried out by the reflected-light analysis section 13.

The reflected-light analysis section 13 finds a Fourier transform signal S (w) of a detected signal s (t) received from the reflected-light detection section 12. In addition, the reflected-light analysis section 13 also finds a Fourier transform code series $p_i$ (w) of every known code series $p_i$ (t) in advance.

Then, the reflected-light analysis section 13 computes the inner product of the complex conjugate S* (w) of the Fourier transform signal S (w) of the detected signal s (t) and the Fourier transform code series $p_i$ (w) of every code series $p_i$ (t). Subsequently, the reflected-light analysis section 13 carries out inverse Fourier transform processing on the inner product.

To put it in detail, for every code series $p_i$ (t) where i=1 to K, the reflected-light analysis section 13 carries out inverse Fourier transform processing according to the following equation:

$$p_i(t) = \text{InverseFourier}[p_i(w) \cdot S^*(w)][t]$$

A result of the inverse Fourier transform processing indicates that a code series $p_i$ (t) for which the light reflection body 3 exists has a peak whereas a code series $p_i$ (t) for which the light reflection body 3 does not exist does not have a peak. If the code series $p_i$ (t) has a peak, the position of the peak on the time axis corresponds to the position (or the azimuth) of the light reflection body 3 in the horizontal direction.

The diagram of FIG. 9 shows the result of the inverse Fourier transform processing carried out for the code series $p_{10}$ of the example shown in the diagram of FIG. 8. As shown in the diagram of FIG. 9, the code series $p_{10}$ (t) has a peak at a position on the horizontal axis. The position on the horizontal axis represents the time period Δt. In addition, as a result of the inverse Fourier transform processing, the code series $p_{15}$ (t) not shown in the diagram of FIG. 9 also has a peak.

If the light reflection body 3-1 exists at a position corresponding to a code series between the code series $p_{10}$ (t) and a code series $p_{11}$ (t) for example, the reflected-light detection section 12 detects both a signal at a level half of the output level of the signal for the code series $p_{10}$ (t) and a signal at a level half of the output level of the code series $p_{11}$ (t). Thus, the reflected-light analysis section 13 is capable of finding the azimuth of the light reflection body 3-1 in the vertical direction in accordance with a ratio of the output level (that is, the peak) of the code series $p_{10}$ (t) obtained as a result of the inverse Fourier transform processing to the output level (that is, the peak) of the code series $p_{11}$ (t) obtained as a result of the inverse Fourier transform processing. With a code series taken as a unit used for expressing the position of the light reflection body 3-1, the value found by the reflected-light analysis section 13 to serve as a value expressing the azimuth of the light reflection body 3-1 is represented by a number including a decimal point for separating the integer and fraction parts of the number from each other. The fraction part of the number represents the position corresponding to a code series between the code series $p_{10}$ (t) and a code series $p_{11}$ (t). In this way, the vertical-direction azimuth of the light reflection body 3-1 can be detected with a higher degree of precision.

Even if light portions are reflected by a plurality of light reflection bodies 3 and received from the light reflection bodies 3 at the same time as described above, inner products of Fourier transform signals and Fourier transform code series are found and inverse Fourier transform processing is carried out on each of the inner products so as to identify the light reflection bodies 3. Thus, it is possible to detect the azimuths (that is, the positions) of every light reflection body 3 in the vertical and horizontal directions.

Figure 10:
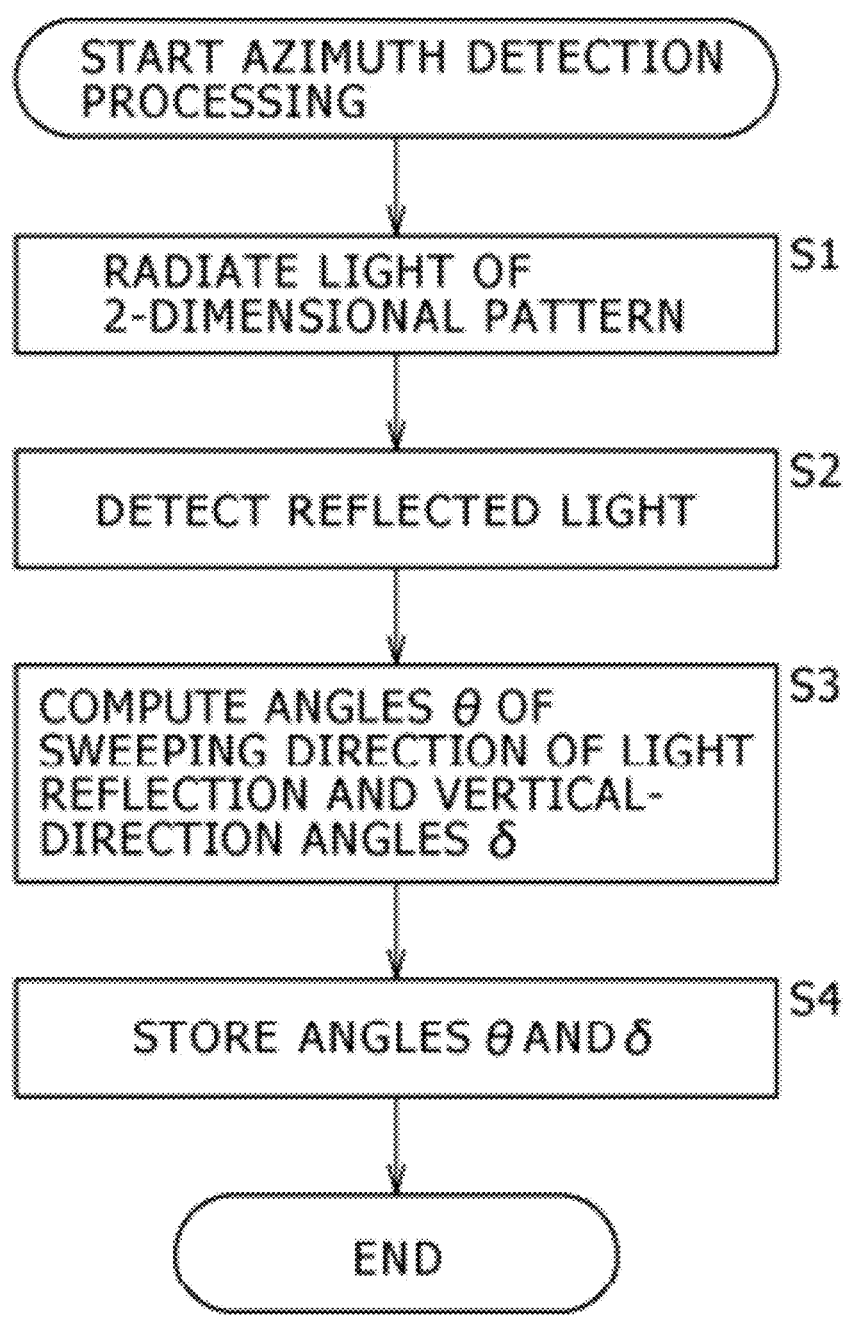
FIG. 10 shows a flowchart of azimuth detection processing carried out by the object detection system shown in the diagram of FIG. 1.

Next, azimuth detection processing carried out by the object detection system 1 is explained by referring to a flowchart shown in FIG. 10.

As shown in the figure, the flowchart begins with a step S1 at which the light-pattern projection section 11 radiates light of a two-dimensional pattern to the light reflection body 3. To put it in detail, in the light-pattern projection section 11, laser light emitted by the light source 21 is radiated to the hologram sheet 22A on which the two-dimensional pattern has been created. The hologram sheet 22A serves as the radiation-pattern generation block 22. A galvano mirror is used as the light sweeping block 23 by the hologram sheet 22A to carry out a light sweeping operation by changing the angle of the radiation of light of the two-dimensional pattern in a back-and-forth movement within an angle range determined at a certain speed (that is, a certain angular speed). As a result, the light of the two-dimensional pattern is radiated by the light sweeping block 23 to the light reflection body 3.

By acquiring the angle of the galvano mirror for example, the light-pattern projection section 11 is capable of obtaining a time at which a light beam is radiated by any particular one of the code series and a direction in which the light beam is radiated by the particular code series. The reflected-light detection section 12 provides the reflected-light analysis section 13 with a relation between the radiation time of light from a code series and the azimuth of a light reflection body 3 which reflects the light.

Then, at the next step S2, the reflected-light detection section 12 detects light radiated from the light-pattern projection section 11 to the light reflection body 3 and reflected by the light reflection body 3 to the reflected-light detection section 12. The reflected-light detection section 12 converts the detected light reflected by the light reflection body 3 into an electrical signal and supplies the electrical signal to the reflected-light analysis section 13 as a detection signal.

Subsequently, at the next step S3, the reflected-light analysis section 13 computes a horizontal-direction angle $\theta$ and a vertical-direction angle $\delta$, which indicate the position of the light reflection body 3, on the basis of the detection signal received from the reflected-light detection section 12. To put it in detail, the reflected-light analysis section 13 carries out an analysis for determining which code series has radiated the light detected by the reflected-light detection section 12. By determining which code series has radiated the light detected by the reflected-light detection section 12, the reflected-light analysis section 13 is capable of computing the vertical-direction angle $\delta$ of the light reflection body 3. In addition, on the basis of information on the relations between the radiation times of light from code series in the light-pattern projection section 11 and the azimuths of the light reflection body 3 which has reflected the light, the reflected-light analysis section 13 recognizes the radiation times of light from the code series at the azimuths. Thus, the reflected-light analysis section 13 is capable of computing the horizontal-direction angle $\theta$ of the light reflection body 3 from a delay time. The delay time is a time period from the radiation start time to a time at which light radiated by a code series determined in advance is detected by the reflected-light detection section 12.

Then, at the next step S4, the reflected-light analysis section 13 stores the horizontal-direction angle $\theta$ and the vertical-direction angle $\delta$ in a recording medium such as a semiconductor memory as results of the analysis.

For example, when the user enters a command to start the azimuth detection processing by typically operating an operation button shown in none of the figures, the azimuth detector 2 starts the azimuth detection processing represented by the flowchart shown in the diagram of FIG. 10 and carries out the processing repeatedly till the user enters a command to stop the processing.

In accordance with the object detection system 1 described above, the light reflection body 3 is attached on a predetermined location of an object which serves as a subject of azimuth detection. Then, a light sweeping operation is carried out by continuously changing a direction in which light of a known two-dimensional pattern is radiated. Thus, the horizontal-direction and vertical-direction azimuths of the light reflection body 3 serving as a light radiation target can be detected with a high degree of precision.

In accordance with the object detection system 1 described above, the light-pattern projection section 11 radiates light of a known two-dimensional pattern to an object serving as a subject of azimuth detection and the light reflection body 3 is merely attached to the object to serve as a target of the light radiation. Thus, it is not necessary to request a person subject to the measurement to stay in a special environment as is the case with the object detection method adopting the chromakey technique. That is to say, the light reflection body 3 needs to be merely attached to the object to serve as a target of the light radiation. As a result, the target can be detected with ease.

In addition, in accordance with the object detection system 1 described above, the light reflection body 3 is used for reflecting radiated light in a direction opposite to the direction in which the light is radiated to the light reflection body 3. Thus, while the light of a known two-dimensional pattern is being radiated to the object, the light reflected by the light reflection body 3 attached to the object is focused on one point. As a result, it becomes unnecessary to make use of a two-dimensional image taking device such as a CCD (Charge Coupled Device) in the reflected-light detection section 12. For example, a simple light receiving device such as a photodiode is good enough to function as the reflected-light detection section 12. Therefore, by using a small-size and low-cost optical system, the azimuths of the light reflection body 3 can be detected with a high degree of precision. In addition, even if light portions are reflected by a plurality of light reflection bodies 3 and received from the light reflection bodies 3 at the same time as described above, it is possible to identify each of the light reflection bodies 3 and detect the azimuths (that is, the positions) of every the light reflection body 3 in the vertical and horizontal directions.

On top of that, by radiating light of a known two-dimensional pattern to an object, it is possible to provide the light radiation with redundancies and reduce the output of the radiated light. That is to say, what is radiated is a sequence of redundant code series so that, even if a portion of the sequence is lost, it is still possible to identify code series remaining in the sequence. Thus, even if a laser-light source is employed as the light source 21, a low-level output generated by the light source 21 will be sufficient. As a result, it is possible to avoid bad effects on the body of the person who serves as the subject of measurements.

It is to be noted that, in the embodiment described so far, what can be detected by the object detection system 1 is only the azimuths of a target attached to an object which serves as the subject of measurements. By adopting a configuration shown in a diagram of FIG. 11, however, it is possible to detect positions which are each expressed by coordinates in a three-dimensional coordinate system provided for the target.

[Other Embodiments Implementing the Object Detection System 1]

Figure 11:
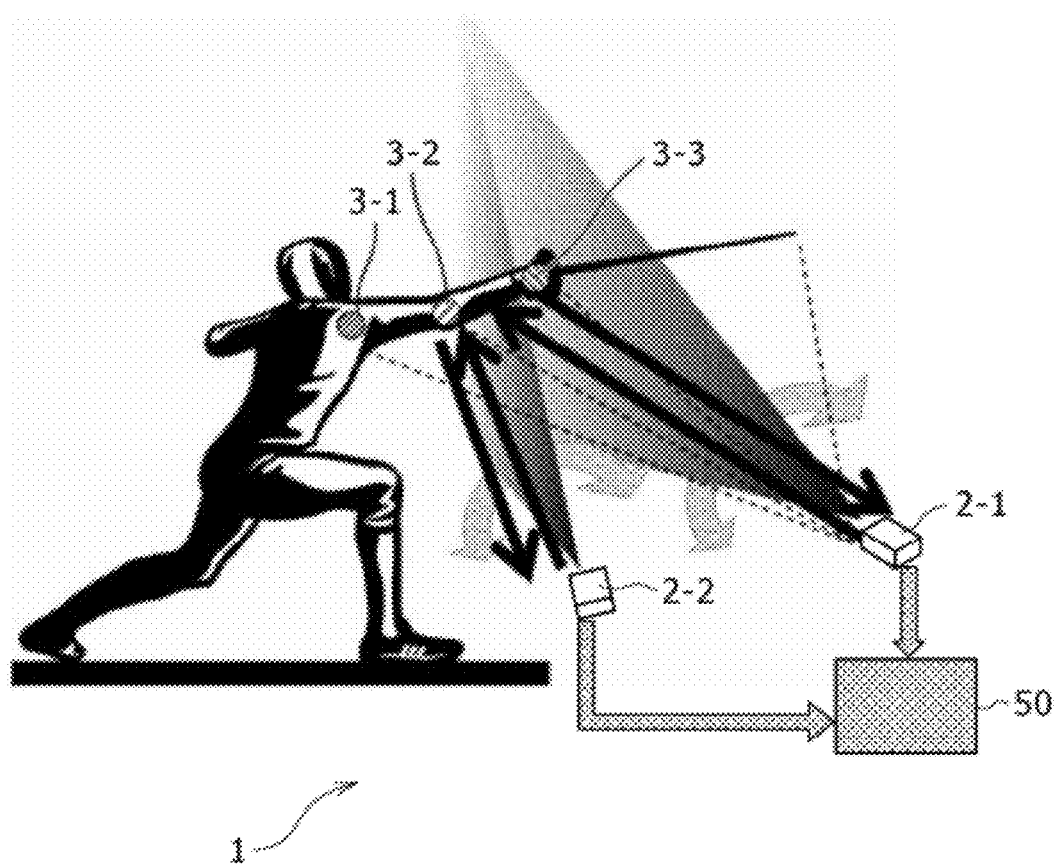
FIG. 11 is an explanatory diagram showing another typical configuration of an object detection system.

FIG. 11 is an explanatory diagram showing another typical configuration of the object detection system 1.

The object detection system 1 having the configuration shown in the explanatory diagram of FIG. 11 employs two azimuth detectors, i.e., azimuth detectors 2-1 and 2-2. 3 light reflection bodies 3-1 to 3-3 are each attached to typically an arthrosis of the body of a person, who serves as the subject of measurements, to function as a target of azimuth detection. In addition, the azimuth detectors 2-1 and 2-2 are connected to a position detector 50.

Information on the relation between the positions of the azimuth detectors 2-1 and 2-2 is entered to the position detector 50 in advance. The azimuth detectors 2-1 and 2-2 supply the angles δ and θ of each of the light reflection bodies 3-1 to 3-3 to the position detector 50. On the basis of the angles δ and θ received from the azimuth detectors 2-1 and 2-2 as angles of each of the light reflection bodies 3-1 to 3-3, the position detector 50 computes coordinates of the positions of the light reflection bodies 3-1 to 3-3 in the three-dimensional coordinate system in accordance with the so-called triangulation principle.

It is to be noted that the position detection (computation) processing carried out by the position detector 50 can also be left to the azimuth detector 2-1 or 2-2.

As described above, by adopting the 2 azimuth detectors 2-1 and 2-2, the position of each light reflection body 3 in the three-dimensional coordinate system can be detected.

The operation to detect the position of an object in the three-dimensional coordinate system can be applied to processing to acquire a movement of a member of a human-being body as a movement expressing a natural motion of the human being in typically a game using CG images and a special operation to take an image of a photographing subject. In addition, in order to indicate a functional improvement resulting from rehabilitations for a patient as an improvement of a predetermined member of the patient, the operation to detect the position of an object in the three-dimensional coordinate system can be applied to processing to acquire a movement of the predetermined member.

[Other Modified Versions]

In the embodiment explained before by referring to the diagram of FIG. 5, the configuration of the radiation-pattern generation block 22 and the light sweeping block 23 is a configuration in which the hologram sheet 22A carries out a light sweeping operation by using a galvano mirror.

Furthermore, each of configurations like ones shown in diagrams of FIG. 12 can also be adopted as a configuration of the radiation-pattern generation block 22 and the light sweeping block 23.

Figure 12A:
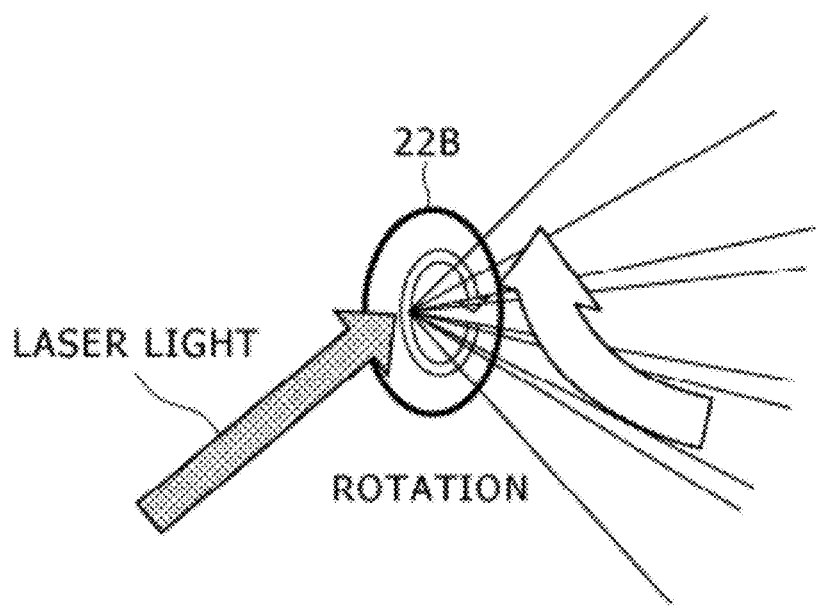
FIGS. 12A and 12B are diagrams each showing another typical configuration of the radiation-pattern generation block and the light sweeping block.

FIG. 12A shows a typical configuration in which a circular hologram sheet 22B is used as the radiation-pattern generation block 22 whereas a motor not shown in the diagram is used as the light sweeping block 23. In the typical configuration shown in the diagram of FIG. 12A, the motor rotates the circular hologram sheet 22B by taking the center of the circular hologram sheet 22B as the shaft of the rotation.

The light source 21 radiates laser light to a predetermined range of the circular hologram sheet 22B. The motor used as the light sweeping block 23 rotates the circular hologram sheet 22B by taking the center of the circular hologram sheet 22B as the shaft of the rotation in order to radiate light of the two-dimensional pattern to the light reflection body 3.

Figure 12B:
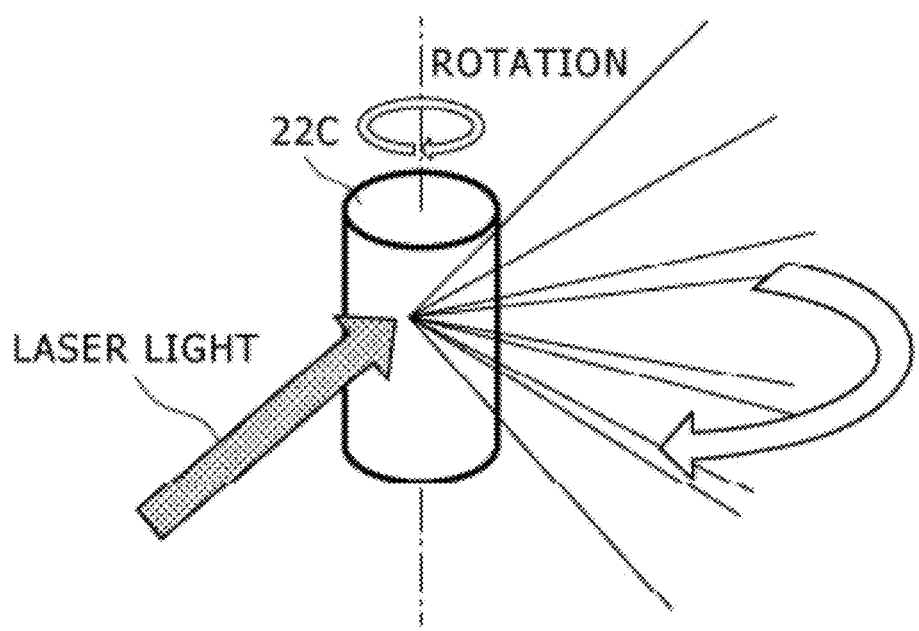

In the typical configuration shown in the diagram of FIG. 12B, on the other hand, the cylinder 22C used as the radiation-pattern generation block 22 has a hologram sheet on the side surface thereof. The motor rotates the cylinder 22C by taking the center of the cylinder 22C as the shaft of the rotation.

The light source 21 radiates laser light to a predetermined range on the side surface of the cylinder 22C. The motor used as the light sweeping block 23 rotates the cylinder 22C by taking the center of the cylinder 22C as the shaft of the rotation in order to radiate light of the two-dimensional pattern to the light reflection body 3.

It is to be noted that, when the hologram sheet 22A having a planar shape as shown in the diagram of FIG. 5 is carrying out a light sweeping operation, code-series light radiated to the light reflection body 3 is inverted during propagation through round-trip paths oriented in the sweeping direction. In the case of the configurations shown in the diagrams of FIGS. 12A and 12B, on the other hand, when light of the two-dimensional pattern is being radiated by one-directional rotation taking a common shaft as the center, the light of each code series is fixed in one direction and never inverted. In either case, the light-pattern projection section 11 is capable of obtaining information on a time at which the light of the code series has been radiated and information on a direction in which the light of the code series has been radiated. Thus, there is no problem. In addition, in the case of the typical configuration shown in the diagram of FIG. 5, the hologram sheet 22A having a planar shape is also capable of carrying out a light sweeping operation in the vertical direction. In this case, the azimuth detector 2 computes the horizontal-direction position (that is, the horizontal-direction azimuth) by identifying a particular one of code series lining up in the vertical direction. In addition, the azimuth detector 2 computes the vertical-direction position (that is, the vertical-direction azimuth) by identifying a particular one of code series lining up in the vertical direction.

On top of that, the light-pattern projection section 11 can have a configuration other than the configurations described so far. For example, the light-pattern projection section 11 may employ a two-dimensional LED as the light source 21 and employ a light shielding filter as the radiation-pattern generation block 22. In this configuration, the light shielding filter eliminates some light so as to output light corresponding to light of the two-dimensional pattern. Then, the light sweeping block 23 carries out a light sweeping operation on the two-dimensional LED, which is attached to the front surface of the light shielding filter, in order to radiate light of the two-dimensional pattern to the light reflection body 3.

As the light sweeping block 23, it is possible to employ a MEMS (Micro Electro Mechanical Systems) or the like in addition to the galvano mirror.

In addition, the light reflection body 3 is by no means limited to the corner cube having a spherical shape as described earlier. For example, the light reflection body 3 can be a light reflection plate which has a planar shape.

On top of that, a filter passing on only light having a wavelength determined in advance can be provided on the front surface of the reflected-light detection section 12 in order to increase the S/N ratio of the detected signal. To put it more concretely, the wavelength determined in advance is 633 nm which is the same wavelength as that of the laser light.

The processing explained earlier to compute angles θ and δ can be carried out in the reflected-light analysis section 13 by hardware and/or execution of software. By the same token, the processing explained earlier to compute a position in the three-dimensional coordinate system can be carried out in the position detector 50 by hardware and/or execution of software. If the processing is carried out in the reflected-light analysis section 13 or the position detector 50 by execution of software, programs composing the software can be installed into a computer embedded in dedicated hardware, a general-purpose personal computer or the like from typically a network or a removable recording medium. In this case, the computer or the personal computer serves as the reflected-light analysis section 13 or the position detector 50. A general-purpose personal computer is a personal computer, which can be made capable of carrying out a variety of functions by installing a variety of programs into the personal computer. In the following description, the computer embedded in dedicated hardware and the general-purpose personal computer are both referred to simply as a computer.

FIG. 13 is a block diagram showing a typical hardware configuration of the computer for executing the programs to carry out processing to compute the azimuth expressed in terms of the angles θ and δ of the light reflection body 3 or the position of the light reflection body 3.

The computer shown in the block diagram of FIG. 13 employs a CPU (Central Processing Unit) 101, a ROM (Read Only Memory) 102 and a RAM (Random Access Memory) 103 which are connected to each other by a bus 104.

The bus 104 connecting the CPU 101, the ROM 102 and the RAM 103 each other is also connected to an input/output interface 105. The input/output interface 105 is further connected to an input section 106, an output section 107, the storage section 108 cited above, a communication section 109 and a drive 110.

The input section 106 includes a keyboard, a mouse and a microphone whereas the output section 107 includes a display unit and a speaker. The storage section 108 includes a hard disk and/or a nonvolatile memory. The communication section 109 is a unit for carrying out communication processing with apparatus other than this computer through a network not shown in the figure.

As described above, the input/output interface 105 is also connected to the drive 110 on which a removable recording medium 111 is mounted. The removable recording medium 111 can be a magnetic disk, an optical disk, a magneto-optical disk or a semiconductor memory. A computer program to be executed by the CPU 101 is installed from the removable recording medium 111 into the storage section 108.

In the computer with the configuration described above, the CPU 101 typically loads a program stored in the storage section 108 to the RAM 103 by way of the input/output interface 105 and the bus 104, executing the loaded program in order to carry out the processing to compute an azimuth or a position.

The aforementioned removable recording medium 111 for recording programs to be installed into the computer as programs to be executed by the CPU 101 employed in the computer is typically a package recording medium provided to the user separately from the main unit of the computer shown in the block diagram of FIG. 13. Instead of installing the programs from the removable recording medium 111 into the computer, the programs can be downloaded from a program provider to the computer by using the transmission medium which can be wire or radio communication. To put it more concretely, the programs are downloaded from the program provider to the computer by wire communication through a network such as a LAN (Local Area Network) or the Internet. As an alternative, the programs are downloaded from the program provider to the computer by radio communication through a digital satellite.

In the computer, when the removable recording medium 111 is mounted on the drive 110, programs recorded in advance on the removable recording medium 111 are installed in the storage section 108 by way of the input/output interface 105. On the other hand, programs downloaded from a program provider to the computer by using the transmission medium implemented as wire or radio communication are received by the communication section 109 to be installed in the storage section 108. As an alternative, the programs can be installed in the ROM 102 and/or the storage section 108 in advance.

It is also worth noting that a program to be executed by the computer can be a program to be executed to carry out steps of the processing described earlier in a pre-prescribed order along the time axis as explained in this specification, but can also be a program to be executed to carry out steps of the processing described earlier with necessary timings which can be concurrent timings or individually triggered timings.

It is also to be noted that the technical term 'system' used in this specification implies the configuration of a confluence including a plurality of apparatus.

Implementations of the present invention are by no means limited to the embodiments explained earlier and the other modified versions described before. That is to say, each of the embodiments and the other modified versions can be further changed to any one of a variety of implementations as long as the implementations fall within a range which does not depart from essentials of the present invention.

The present application contains subject matter related to that disclosed in Japanese Priority Patent Application JP 2009-174328 filed in the Japan Patent Office on Jul. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An object detection system comprising:
    light radiation means for radiating light of a two-dimensional pattern to an object;
    light sweeping means for carrying out a sweeping operation by continuously changing the radiation direction of said light of a two-dimensional pattern within a space determined in advance;
    light reflection means attached to a predetermined location on said object to serve as a detection subject and used for reflecting said light of a two-dimensional pattern in a direction opposite to said radiation direction of said light of a two-dimensional pattern;
    reflected-light detection means for detecting said light reflected by said light reflection means to appear as light arriving at said reflected-light detection means; and
    reflected-light analysis means for computing vertical-direction and horizontal-direction angles on the basis of a signal representing said reflected light detected by said reflected-light detection means,
    wherein,
        said two-dimensional pattern is configured to include code series generated by using two-dimensional M-sequence random numbers indicating the nonexistence and existence of a square pattern,
        said reflected-light analysis means computes: one of said vertical-direction and horizontal-direction angles of said light reflection means by identifying said code series, and the other vertical-direction and horizontal-direction angle of said light reflection means by detecting a phase shift of said identified code series.

2. The object detection system according to claim 1 wherein said reflected-light analysis means computes said vertical-direction and horizontal-direction angles by:
    finding an inner product of a complex conjugate of a Fourier transform signal of said signal representing said detected light and a Fourier transform code series of said code series corresponding to said detected light for each of said code series; and carrying out inverse Fourier transform processing on each of said inner products.

3. The object detection system according to claim 1 wherein said reflected-light analysis means finds a vertical-direction azimuth of said light reflection means by division to compute a value according to a ratio of the output level of light generated by a specific one of said code series to the output level of light generated by another one of said code series.

4. The object detection system according to claim 1, said object detection system comprising:
- two means pairs each composed of said light radiation means and said light sweeping means; and
- position detection means for computing a position of said light reflection means in a three-dimensional coordinate system from vertical-direction and horizontal-direction angles found as said vertical-direction and horizontal-direction angles of said light reflection means from said signal representing said reflected light for each of said means pairs each composed of said light radiation means and said light sweeping means.

5. An object detection method comprising the steps of:
radiating light of a two-dimensional pattern to an object;
carrying out a sweeping operation by continuously changing the radiation direction of said light of a two-dimensional pattern within a space determined in advance;
letting a detection subject attached to a predetermined location on said object reflect said light of a two-dimensional pattern in a direction opposite to said radiation direction of said light of a two-dimensional pattern;
detecting said reflected light arriving from said detection subject; and
computing vertical-direction and horizontal-direction angles, which are each formed by a line connecting light radiation means for radiating said light of a two-dimensional pattern to said detection subject and a reference line in a vertical or horizontal direction respectively, on the basis of a signal representing said detected reflected light,
wherein,
said two-dimensional pattern is configured to include code series generated by using two-dimensional M-sequence random numbers indicating the nonexistence and existence of a square pattern,
one of said vertical-direction and horizontal-direction angles is computed by identifying said code series, and the other vertical-direction and horizontal-direction angle is computed by detecting a phase shift of said identified code series.

6. An object detection system comprising:
a light radiation section configured to radiate light of a two-dimensional pattern to an object;
a light sweeping block configured to carry out a sweeping operation by continuously changing the radiation direction of said light of a two-dimensional pattern within a space determined in advance;
a light reflection body attached to a predetermined location on said object to serve as a detection subject and used for reflecting said light of a two-dimensional pattern in a direction opposite to said radiation direction of said light of a two-dimensional pattern;
a reflected-light detection section configured to detect said light reflected by said light reflection body to appear as light arriving at said reflected-light detection section; and
a reflected-light analysis section configured to compute vertical-direction and horizontal-direction angles, which are each formed by a line connecting said light radiation section to said light reflection body and a reference line in a vertical or horizontal direction respectively, on the basis of a signal representing said reflected light detected by said reflected-light detection section,
wherein,
said two-dimensional pattern is configured to include code series generated by using two-dimensional M-sequence random numbers indicating the nonexistence and existence of a square pattern,
said reflected-light analysis section finds a vertical-direction azimuth of said light reflection body by division to compute a value according to a ratio of the output level of light generated by a specific one of said code series to the output level of light generated by another one of said code series.

* * * * *